United States Patent [19]

Schimitschek et al.

[11] 4,229,711
[45] Oct. 21, 1980

[54] METAL DIHALIDE PHOTODISSOCIATION CYCLIC LASER

[75] Inventors: Erhard J. Schimitschek; John E. Celto, both of San Diego; John A. Trias, La Mesa, all of Calif.

[73] Assignee: The United States of America as represented by the Secretary of the Navy, Washington, D.C.

[21] Appl. No.: 936,289

[22] Filed: Aug. 23, 1978

[51] Int. Cl.$^3$ .................. H01S 3/091; H01S 3/14
[52] U.S. Cl. .................. 331/94.5 P; 331/94.5 G
[58] Field of Search .................. 331/94.5 G, 94.5 PE, 331/94.5 P

[56] References Cited

PUBLICATIONS

R. N. Zare et al., "Atomic and Molecular Fluorescence Excited by Photodissociation", Appl. Opt. Suppl. 2, Jun. 1965, pp. 193-200.

J. M. Hoffman et al., "High-Power UV Noble-Gas-Halide Lasers*", Appl. Phys. Lett. vol. 28, No. 9, May 1, 1976, pp. 538-539.

J. H. Parks, "Laser Action on the $B^2\Sigma^+_{\frac{1}{2}} \to X^2\Sigma^+_{\frac{1}{2}}$ Band of HgBr at 5018 Å", Appl. Phys. Lett., vol. 31, No. 4, Aug. 15, 1977, pp. 297-299.

*Primary Examiner*—James W. Davie
*Attorney, Agent, or Firm*—Richard S. Sciascia; George J. Rubens; Harvey Fendelman

[57] ABSTRACT

A pulsed laser produces emitted laser energy by photodissociation of metal dihalide and cyclic recombination. A metal dihalide selected from sub-group II-B of the periodic table of elements is contained within an elongated sealed enclosure. Ultraviolet photons supplied from another laser employed as an excitation pump causes dissociation of the metal dihalide for achieving the ultimate laser action. An inert buffer gas is included within the enclosure for aiding photon energy transfer uniformity and to provide vibrational relaxation of the lasing medium in its electronic states. Two reflective surfaces, one of which is only partially reflective, are aligned with the principal axis of the laser assembly for producing an optical resonator for the emitted laser energy.

15 Claims, 2 Drawing Figures

METAL DIHALIDE PHOTODISSOCIATION CYCLIC LASER

CROSS REFERENCE TO RELATED APPLICATIONS

The present invention is related to U.S. Patent Application Ser. No. 874,434 filed on Feb. 2, 1978 in the name of the present inventors, now Pat. No. 4,168,475, the same being hereby incorporated herein in its entirety by reference.

BACKGROUND OF THE INVENTION

Advanced Navy systems for underwater communications, ranging, detection, and surveillance heavily depend on the availability of blue-green efficient lasers. No lasers have been disclosed which operate in the blue-green spectral region within that band of wavelengths known as the "ocean window" wherein light energy transmittance is achieved through ocean waters with the least attenuation.

Photodissociation of a parent molecule into excited fragments for the purpose of generating a population inversion has been used successfully in the past for laser action. The first laser based on excitation by photodissociation was reported by Kaspers and Pimental (*Applied Physics Letters* 5, 231 (1964)) who achieved lasing at 1.315μ in atomic iodine by dissociating either $CH_3I$ or $CF_3I$. Most subsequently reported laser transitions based on this principle of excitation occurred also in the infrared spectral region, either between atomic states like Br, K, Rb and Cs or between rotational-vibrational levels of molecular electronic ground states like NO or CN. Only very recently, a visible atomic transition in In at 451 nm was reported by R. Burnham in *Applied Physics Letters*, 30, 132 (1977).

SUMMARY OF THE INVENTION

The present invention relates to the first known implementation of laser action in the visible spectral region between two molecular electronic states of which the upper one is a direct product of photodissociation. The parent molecule as disclosed herein is $HgBr_2$ in the vapor phase, which dissociates and recombines according to the following reaction scheme:

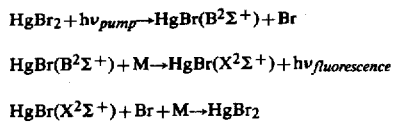

In 1927 Terenin investigated the optical dissociation of the mercuric halides and was able to identify in each case the fluorescing fragment as the mercuric halide radical (A. Terenin, Z. Physik, 44, 713 (1927)). In a series of papers, Wieland studied the photodissociation of the mercuric halides in detail and performed a vibrational analysis of the fluorescence spectra. In particular, the continuous absorption region of $HgBr_2$ located between 190 and 210 nm leads predominantly to dissociation into $HgBr(B^2\Sigma^+)$ which shows a band of emission from 505 to 350 nm.

In the present invention, a metal dihalide selected from sub-group II-B of the periodic table of elements is contained within a sealed enclosure or cell. Laser action is achieved by the photodissociation of mercuric bromide which produces an output in the 502 nm to 505 nm spectral ranges. This is within the "ocean window" since it continues a wavelength region which permits the transmission of light energy in ocean waters.

Mercuric Bromide ($HgBr_2$) maintained in its vapor state is pumped with energy in the 193 nm region. This energy, in the preferred embodiment, is produced by an argon fluoride excimer laser raising triatomic mercuric bromide molecules to a higher energy level where they dissociate into electronically excited diatomic mercurous bromide and bromine and producing laser energy in the visible blue-green spectral region. The mercurous bromide radical recombines with the free bromine after lasing to form the original mercuric bromine, thereby alleviating deterioration of the lasing material that might otherwise occur.

The very small amount of $HgBr_2$ needed is hermetically sealed in a quartz cell contained within an oven. In addition to the metal dihalide within the sealed enclosure, an amount of a selected inert gas, e.g. He, is added to assist in vibrational relaxation. The sealed enclosure assembly is preferably operated at an elevated temperature of approximately the order of 125° C. When operated under these conditions, the present invention will produce a partial pressure of the selected metal dihalide of the order of 0.45 torr. The focusing of a pump laser beam on the cell with an ultraviolet grade lens produces the lasing action.

Of particular interest and advantage is the fact that the present invention, operating, for example, with $HgBr_2$ produces output laser energy by the simultaneous narrowing of the broad fluorescence spectrum band of the HgBr radical into a few very narrow laser lines centered around 502 nm, which is in the blue-green spectral region within that band of wavelengths known as the "ocean window" wherein light energy transmittance is achieved through ocean waters with the least attenuation.

Accordingly, it is a primary object of the present invention to provide a laser which is operative in a visible spectral region, particularly within the blue-green wavelengths known to be best transmitted through ocean waters.

A further object of the present invention is to provide such a laser which is directly excited through the use of an auxiliary external excitation source.

Another important object of the present invention is to provide such a laser which is inherently wavelength tunable.

A further object of the present invention is to provide such a laser which operates in a closed cyclic mode of continuously repeated dissociation and recombination of the lasing material.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENT

Figures 1, 2:
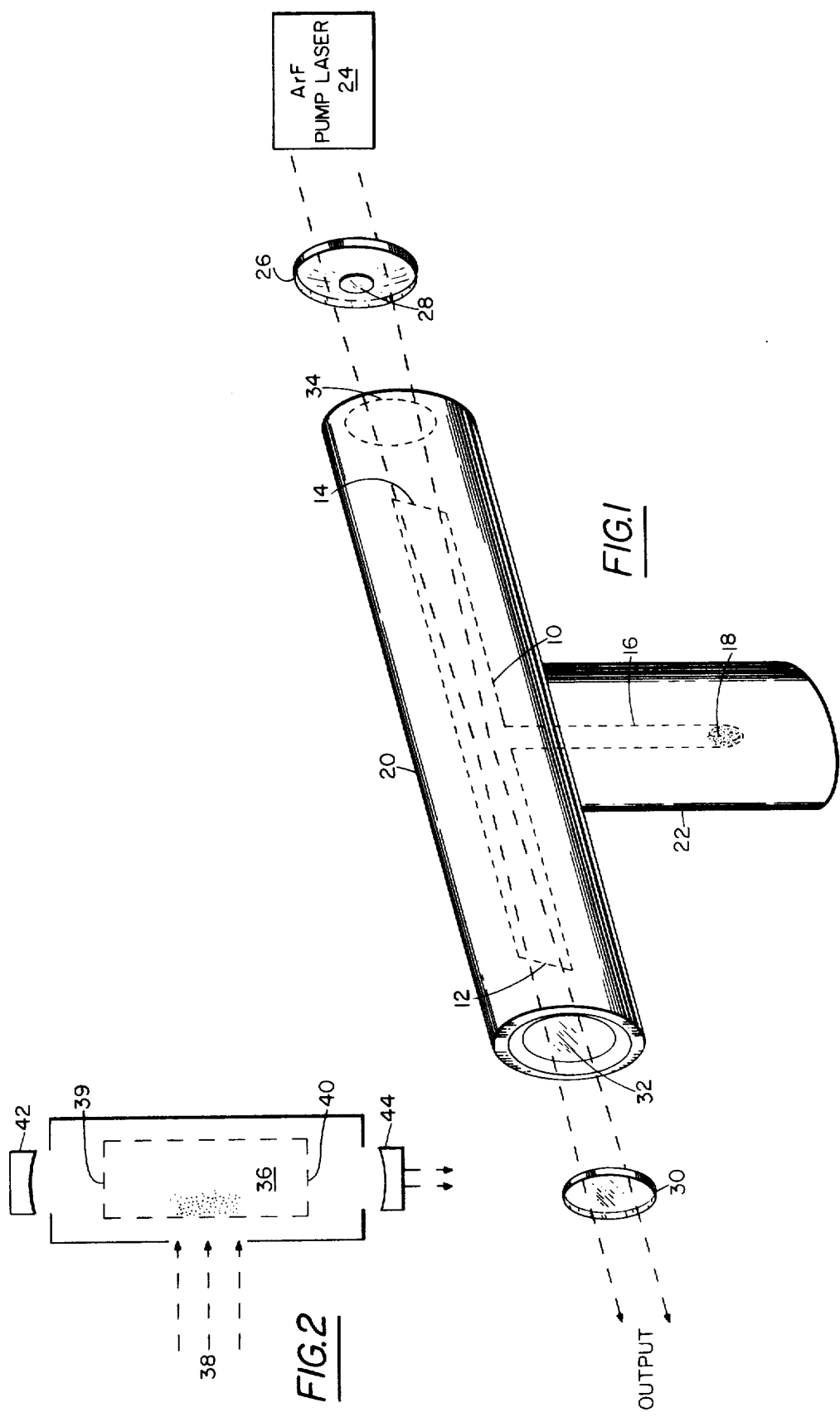
FIG. 1 is a perspective view of an embodiment of the laser cell assembly or enclosure employed in the practice of the present invention operated in the longitudinal pumping mode.
FIG. 2 is a schematic diagram illustrating an alternate embodiment of the present invention wherein transverse pumping is utilized.

Referring now to FIG. 1 there is illustrated a preferred embodiment of the mercuric bromide photodissociation laser of the present invention. This longitudinal excitation implementation is comprised of a quartz tube 10 having, for example, an inside diameter of 8 mm and being 20 cm long. The quartz tube 10 is equipped with Brewster angle windows 12 and 14 and a side arm 16. Disposed within the side arm 16 is a small amount of $HgBr_2$ 18, preferably of 99.9% purity. After evacuation, the cell 10 is filled with 250 torr of He and the side arm 16 is flame sealed. The filled cell is placed into a tube oven 20 with the side arm 16 extending into another tube oven 22. The side arm temperature is kept at about 125° C. resulting in an $HgBr_2$ vapor pressure of approximately 0.45 torr. The rest of the cell is heated to approximately 150° C. to avoid vapor condensation on the windows 12 and 14.

An argon fluoride (ArF) laser pump 24 such as a Tachisto Model 150XR electric discharge excimer laser is focused onto the cell 10 by means of an ultraviolet grade spherical lens 26 of, for instance, 2.5 cm diameter and 20 cm focal length. Onto the center of the lens 26 surface facing the cell is glued or otherwise afixed a thin, e.g. 3 mm diameter, dielectric mirrored disc 28 of, e.g. 35 cm radius of curvature coated for maximum reflection between 450 and 550 nm. The diameter of this mirror 28 is kept small with respect to the lens 26 diameter in order to minimize the obstruction of the pump light. A second mirror 30 with the same radius of curvature, coated for 10% transmission is placed on the other side of the cell at a distance of 40 centimeters from the mirror 28. At the chosen temperature, most of the pump light is absorbed along the 20 cm vapor path.

The apertures 32 and 34 at the ends of the oven may remain open as illustrated or may be closed as with quartz windows (not shown).

In the operation of the embodiment of the present invention illustrated in FIG. 1 employing $HgBr_2$ as the metal dihalide to produce laser emission by photodissociation, green laser output from the HgBr has been observed to start at about 5 mJ of ArF pump laser 24 energy. Depending on the mirror alignment, intricate mode patterns have also been observed.

In the transverse pumping arrangement illustrated schematically in FIG. 2, a rectangular quartz cell 36 with flat parallel windows 39 and 40 and dimensions of 1 cm × 1 cm × 5 cm is used and is equipped with a side arm (not shown) for vapor pressure control. The cell is filled and heated as previously described with reference to FIG. 1 but the buffer pressure is 500 torr. Also the length of the upper oven heating the cell is only 10 cm. The beam cross-section 38 of the ArF pump laser is roughly rectangular, about 4×15 mm with the long dimension being the vertical one. To allow for better focusing into a horizontal line, the beam may be rotated by 90° with two 90° ultraviolet grade quartz prisms prior to focusing with a cylindrical lens (focal length 2 cm) onto the inside of the rectangular laser cell. With a side arm temperature of 200° C., the pump light is absorbed within a few tenths of 1 mm by the $HgBr_2$ vapor. With this pumping arrangement, the gain is high enough so that the reflections from the flat cell windows 38 and 40 are sufficient to sustain oscillation. So far, the highest output has been achieved with a resonator consisting of a maximum reflector 42 (radius of curvature 12.5 cm) and a 60% transmission flat output coupler 44. The mirrors 42 and 44 are 20 cm apart. The measured pulse energy of the HgBr laser is 0.25 mJ at a pump energy of 7 mJ entering the $HgBr_2$ vapor cell 36.

The laser output of the embodiment of the present invention illustrated in FIG. 2 was observed with a spectrograph and found to consist of six lines. Table I set forth below shows the measured wavelengths with their tentative assignments. None of the lines coincides with the reported band heads and therefore are believed to belong to individual electronic vibrational rotational transitions.

TABLE I

Measured Laser Wavelengths of the HgBr Transition $B^2\Sigma^+ \rightarrow X^2\Sigma^+$

| λ (air) in nm (accuracy ± 0.1 nm) | estimated intensity (relative scale 1-10) | tentative assignment to v' → v" bands |
|---|---|---|
| 502.0 | 10 | } 0–22 |
| 502.3 | 9 | |
| 502.6 | 5 | |
| 503.9 | 7 | } 3–26 |
| 504.2 | 5 | |
| 504.6 | 2 | |

It is pointed out hereat that $HgBr_2$ seems to be only the first example of a generic class of materials suitable for excitation by photodissociation. Other members of this class include the dihalides of Zn and Cd as well as the organo halides of Hg.

Obviously many modifications and variations of the present invention are possible in the light of the above teachings. It is therefore to be understood that within the scope of the appended claims the invention may be practiced otherwise than as specifically described.

What is claimed is:

1. A pulsed, wavelength tunable, laser producing emitted laser energy by photon impact dissociation of metal dihalides and their cyclic recombination comprising:
   a sealed enclosure;
   a metal dihalide selected from sub-group II-B of the periodic table of elements and contained within said enclosure;
   a source of photon energy disposed in proximity to said sealed enclosure for focusing a photon energy beam on said metal dihalide and for causing dissociation of said metal dihalide;
   a heat source for maintaining said metal dihalide in a vaporized state;
   an inert buffer gas contained within said sealed enclosure; and
   a reflective surface and a partially reflective surface disposed in alignment with the principal axis of said sealed enclosure for producing optical resonance of the emitted laser energy;
   such that following said dissociation of said metal dihalide by said photon energy beam, cyclic recombination of said dissociated metal dihalide occurs to produce said metal dihalide.

2. A pulsed laser as claimed in claim 1 wherein said reflective surface and said partially reflective surface are disposed and supported outside said sealed enclosure.

3. A pulsed laser as claimed in claim 1 wherein said inert buffer gas is a mixture of selected gases.

4. A pulsed laser as claimed in claim 1 wherein said inert buffer gas is chosen from the group of helium, neon, argon, krypton, xenon, and nitrogen.

5. A pulsed laser as claimed in claim 1 wherein said inert buffer gas is a mixture of gases chosen from the group of helium, neon, argon, krypton, xenon, and nitrogen.

6. A pulsed laser as claimed in claim 1 wherein said heat source comprises an oven substantially enclosing said sealed enclosure.

7. A pulsed laser as claimed in claim 1 wherein said heat source maintains said metal dihalide at a temperature of the order of 125° C.

8. A pulsed laser as claimed in claim 1 wherein the operative vapor pressure of said metal dihalide is of the order of 0.45 torr.

9. A pulsed laser as claimed in claim 1 wherein the operative vapor pressure of said inert buffer gas is of the order of 250 torr.

10. A pulsed laser as claimed in claim 1 wherein said source of photon energy emits energy having a wavelength on the order of 193 nm.

11. A pulsed laser as claimed in claim 10 wherein said source of photon energy comprises an excimer laser.

12. The pulsed laser of claim 1 wherein said metal dihalide is $HgBr_2$.

13. The pulsed laser of claim 1 wherein said sealed enclosure comprises:
   a first tube in generally axial alignment with said source of photon energy; and
   a second tube containing said metal dihalide, said second tube being coupled to said first tube.

14. The pulsed laser of claim 13 wherein said heat source comprises a first oven for maintaining said first tube at approximately 150° C. and a second oven for maintaining said second tube at a temperature of approximately 125° C.

15. A method of generating a pulsed wavelength, tunable laser producing emitted laser energy by photon impact dissociation of a metal dihalide and its cyclic recombination comprising the steps of:
   containing in a sealed enclosure having a principal axis said metal dihalide selected from sub-group II-B of the periodic table of elements and containing in said sealed enclosure an inert buffer gas;
   maintaining said metal dihalide in a vaporized state;
   maintaining said inert buffer gas at a temperature higher than the temperature of said metal dihalide;
   positioning a reflective surface and a partially reflective surface in alignment with said principal axis;
   focusing a beam of photon energy onto said metal dihalide for causing photodissociation of said metal dihalide, so as to cause optical resonance between said reflective surfaces so as to generate said laser such that said metal dihalide recombines after said photodissociation into said metal dihalide.

* * * * *